(12) United States Patent
Ilan

(10) Patent No.: US 10,904,456 B1
(45) Date of Patent: Jan. 26, 2021

(54) IMAGING WITH AMBIENT LIGHT SUBTRACTION

(71) Applicant: Sony Semiconductor Solutions Corporation, Kanagawa (JP)

(72) Inventor: Elad Ilan, Western Galilee (IL)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/822,790

(22) Filed: Mar. 18, 2020

(51) Int. Cl.
| | |
|---|---|
| H04N 5/369 | (2011.01) |
| H04N 5/243 | (2006.01) |
| G06T 5/50 | (2006.01) |
| G06K 9/00 | (2006.01) |
| G06T 7/521 | (2017.01) |
| G01S 17/894 | (2020.01) |
| G01S 7/4865 | (2020.01) |
| G01S 7/481 | (2006.01) |

(52) U.S. Cl.
CPC ............ *H04N 5/243* (2013.01); *G01S 7/4814* (2013.01); *G01S 7/4865* (2013.01); *G01S 17/894* (2020.01); *G06K 9/00228* (2013.01); *G06T 5/50* (2013.01); *G06T 7/521* (2017.01); *G06T 2207/10028* (2013.01); *G06T 2207/10048* (2013.01); *G06T 2207/20224* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 2014/0225173 | A1* | 8/2014 | Kim | H01L 27/1461 257/292 |
| 2016/0309135 | A1* | 10/2016 | Ovsiannikov | H04N 5/23245 |
| 2019/0360863 | A1* | 11/2019 | Tang | G01J 1/46 |
| 2020/0018834 | A1* | 1/2020 | Boutaud | G01S 7/4873 |
| 2020/0137330 | A1* | 4/2020 | Van Dyck | G01S 7/4863 |

* cited by examiner

*Primary Examiner* — Christopher G Findley
(74) *Attorney, Agent, or Firm* — Michael Best & Friedrich LLP

(57) ABSTRACT

A time-of-flight image sensor (TOF) for imaging with ambient light subtraction. In one embodiment, the TOF image sensor includes a pixel array, a control circuit, and a signal processing circuit. The signal processing circuit reads out a first data signal from respective first floating diffusions and respective second floating diffusions during a first frame while a light generator is not emitting, reads out a second data signal from the respective first floating diffusions and the respective second floating diffusions during a second frame after the first integration and after a second integration while the light generator is emitting, generate a third data signal indicative of ambient light, generate a fourth data signal indicative of the ambient light and a light signal reflected off an object, and generate a fifth data signal indicative of the light signal by subtracting the third data signal from the fourth data signal.

11 Claims, 4 Drawing Sheets

IMAGING WITH AMBIENT LIGHT SUBTRACTION

BACKGROUND OF THE INVENTION

1. Field of the Invention

This application relates generally image sensors. More specifically, this application relates to a time-of-flight image sensor having imaging with ambient light subtraction.

2. Description of Related Art

Image sensing devices typically include an image sensor, generally implemented as an array of pixel circuits, as well as signal processing circuitry and any associated control or timing circuitry. Within the image sensor itself, charge is collected in a photoelectric conversion device of the pixel circuit as a result of impinging light. There are typically a very large number of individual photoelectric conversion devices (e.g. tens of millions), and many signal processing circuitry components working in parallel. Various components within the signal processing circuitry are shared by a large number of photoelectric conversion devices; for example, a column or multiple columns of photoelectric conversion devices may share a single analog-to-digital converter (ADC) or sample-and-hold (S/H) circuit.

In photography applications, the outputs of the pixel circuits are used to generate an image. In addition to photography, image sensors are used in a variety of applications which may utilize the collected charge for additional or alternative purposes. For example, in applications such as game machines, autonomous vehicles, telemetry systems, factory inspection, gesture controlled computer input devices, and the like, it may be desirable to detect the depth of various objects in a three-dimensional space and/or detect an amount of light reflected off the various objects in the same three-dimensional space.

Moreover, some image sensors support pixel binning operations. In binning, input pixel values from neighboring pixel circuits are averaged together with or without weights to produce an output pixel value. Binning results in a reduced resolution or pixel count in the output image, and may be utilized so as to permit the image sensor to operate effectively in low light conditions or with reduced power consumption.

BRIEF SUMMARY OF THE INVENTION

Various aspects of the present disclosure relate to devices, methods, and systems having imaging with ambient light subtraction therein. Specifically, the present disclosure is directed to AB Frame Correlated Data Sampling (also referred to herein as "AB Frame CDS") is a two floating diffusion to one photoelectric conversion device implementation that enables the subtraction of ambient light by performing two integration, one integration with the illumination source off, and a second integration with the illumination source on. AB Frame CDS processing further separates the illumination signal from ambient light as well as fixed pattern noise due to pixel (mainly source follower offset) and readout electronics. The illumination signal, reflected from the object, may then be used to detect object features.

In one aspect of the present disclosure, a time-of-flight imaging sensor is provided. The time-of-flight imaging sensor includes a pixel array including a plurality of pixel circuits, a control circuit, and a signal processing circuit. Respective pixel circuits of the plurality of pixel circuits individually include a photoelectric conversion device, a first floating diffusion, and a second floating diffusion. The control circuit is configured to control a first reset of respective first floating diffusions and respective second floating diffusions in the respective pixel circuits. The signal processing circuit is configured to read out a first data signal from the respective first floating diffusions and the respective second floating diffusions in the respective pixel circuits during a first frame, the first frame being after the first reset and before a first integration of respective photoelectric conversion devices in the respective pixel circuits while a light generator is in a non-emission state, read out a second data signal from the respective first floating diffusions and the respective second floating diffusions in the respective pixel circuits during a second frame, the second frame being after the first integration and after a second integration of the respective photoelectric conversion devices while the light generator is in an emission state, generate a third data signal by subtracting the first data signal associated with the respective first floating diffusions from the second data signal associated with the respective first floating diffusions, the third data signal being indicative of ambient light received by the respective photoelectric conversion devices, generate a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object, and generate a fifth data signal by subtracting the third data signal from the fourth data signal, the fifth data signal being indicative of the light signal emitted by the light generator while in the emission state and reflected off the object.

In another aspect of the present disclosure, a method for operating a time-of-flight image sensor is provided. The method includes reading out, with a signal processing circuit, a first data signal from respective first floating diffusions and respective second floating diffusions of respective pixel circuits from a plurality of pixel circuits during a first frame, the first frame being after a first reset and before a first integration of respective photoelectric conversion devices in the respective pixel circuits while a light generator is in a non-emission state, wherein each of the respective first floating diffusions and the respective second floating diffusions is electrically connected to only one of the respective photoelectric conversion devices. The method includes reading out, with the signal processing circuit, a second data signal from the respective first floating diffusions and the respective second floating diffusions during a second frame, the second frame being after the first integration and after a second integration of the respective photoelectric conversion devices while the light generator is in an emission state. The method includes generating, with the signal processing circuit, a third data signal by subtracting the first data signal associated with the respective first floating diffusions from the second data signal associated with the respective first floating diffusions, the third data signal being indicative of ambient light received by the respective photoelectric conversion devices. The method includes generating, with the signal processing circuit, a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object. The method also includes generating, with the signal processing circuit, a fifth data signal by subtracting the third data signal from the fourth data signal, the fifth data signal being indicative of the light signal emitted by the light generator while in the emission state and reflected off the object.

In yet another aspect of the present disclosure, a system is provided. The system includes a light generator configured to emit a light wave and a time-of-flight image sensor. The time-of-flight imaging sensor includes a pixel array including a plurality of pixel circuits, a control circuit, and a signal processing circuit. Respective pixel circuits of the plurality of pixel circuits individually include a photoelectric conversion device, a first floating diffusion, and a second floating diffusion. The control circuit is configured to control a first reset of respective first floating diffusions and respective second floating diffusions in the respective pixel circuits. The signal processing circuit is configured to read out a first data signal from the respective first floating diffusions and the respective second floating diffusions in the respective pixel circuits during a first frame, the first frame being after the first reset and before a first integration of respective photoelectric conversion devices in the respective pixel circuits while the light generator is in a non-emission state, read out a second data signal from the respective first floating diffusions and the respective second floating diffusions in the respective pixel circuits during a second frame, the second frame being after the first integration and after a second integration of the respective photoelectric conversion devices while the light generator is in an emission state, generate a third data signal by subtracting the first data signal associated with the respective first floating diffusions from the second data signal associated with the respective first floating diffusions, the third data signal being indicative of ambient light received by the respective photoelectric conversion devices, generate a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object, generate a fifth data signal by subtracting the third data signal from the fourth data signal, the fifth data signal being indicative of the light signal emitted by the light generator while in the emission state and reflected off the object.

In this manner, the above aspects of the present disclosure provide for improvements in at least the technical field of object feature detection, as well as the related technical fields of imaging, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed, devices, methods, and systems may be used in any device in which there is a need to detect object features (for example, facial detection).

Imaging System

Figure 1:
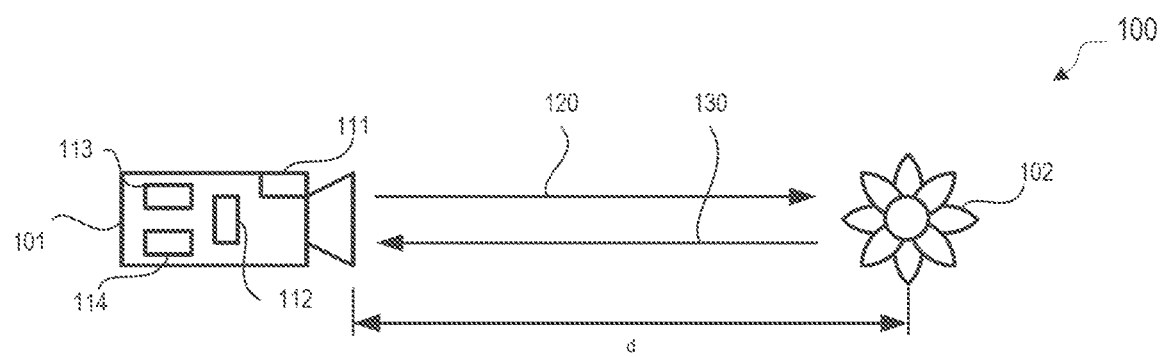
FIG. 1 is a diagram illustrating an exemplary time-of-flight (TOF) imaging environment according to various aspects of the present disclosure.

FIG. 1 is a diagram illustrating an exemplary time-of-flight (TOF) imaging environment 100 according to various aspects of the present disclosure. In the example of FIG. 1, the TOF imaging environment 100 includes a TOF imaging system 101 that is configured to image an object 102 located a distance d away. The TOF imaging system 101 includes a light generator 111 configured to generate an emitted light wave 120 toward the object 102 and an image sensor 112 configured to receive a reflected light wave 130 from the object 102. The emitted light wave 120 may have a periodic waveform. The image sensor 112 may be any device capable of converting incident radiation into signals. For example the image sensor may be a Complementary Metal-Oxide Semiconductor (CMOS) Image Sensor (CIS), a Charge-Coupled Device (CCD), and the like. The TOF imaging system 101 may further include distance determination circuitry such as a controller 113 (for example, a microprocessor or other suitable processing device) and a memory 114, which may operate to perform one or more examples of object feature detection processing (e.g., facial detection) and/or time-of-flight processing as described further below. The light generator 111, the image sensor 112, the controller 113, and the memory 114 may be communicatively connected to each other via one or more communication buses.

The light generator 111 may be, for example, a light emitting diode (LED), a laser diode, or any other light generating device or combination of devices, and the light waveform may be controlled by the controller 113. The light generator may operate in the infrared range so as to reduce interference from the visible spectrum of light, although any wavelength range perceivable by the image sensor 112 may be utilized. In some examples, the controller 113 may be configured to receive a light intensity image from the image sensor 112 in which ambient light has been subtracted from the light intensity image, and detect features of the object 102 with the light intensity image. For example, the light intensity image may be an IR or near-IR light intensity image for detection of facial features. Additionally, in some examples, the controller 113 may also be configured to receive a depth image from the image sensor and calculate a depth map indicative of the distance d to various points of the object 102.

Figure 2:
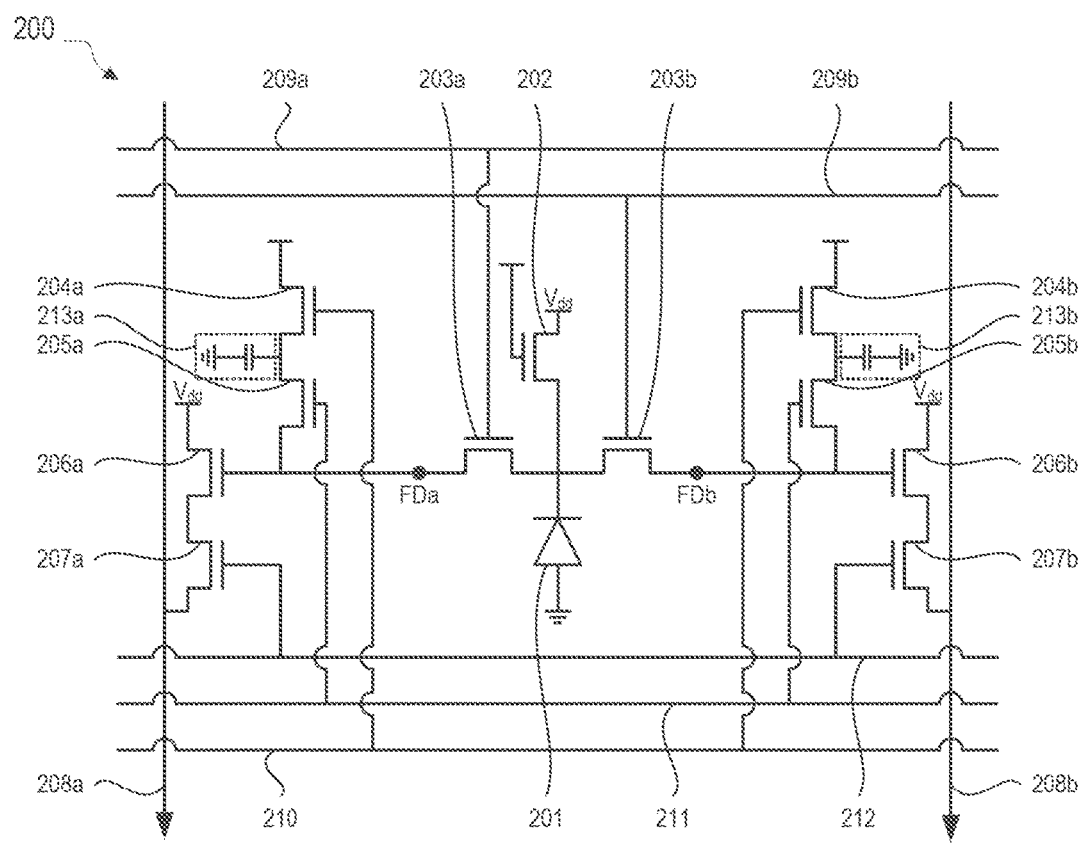
FIG. 2 is a circuit diagram illustrating an exemplary pixel circuit according to various aspects of the present disclosure.

FIG. 2 is a circuit diagram illustrating an exemplary pixel circuit 200 according to various aspects of the present disclosure. As shown in FIG. 2, the pixel circuit 200 includes a photoelectric conversion device 201 (e.g., a photodiode), a pixel reset transistor 202, a first transfer transistor 203a, a second transfer transistor 203b, a first floating diffusion FDa, a second floating diffusion FDb, a first tap reset transistor 204a, a second tap reset transistor 204b, a first intervening transistor 205a, a second intervening transistor 205b, a first amplifier transistor 206a, a second amplifier transistor 206b, a first selection transistor 207a, and a second selection transistor 207b. The photoelectric conversion device 201, the first transfer transistor 203a, the first tap reset transistor 204a, the first intervening transistor 205a, the first amplifier transistor 206a, and the first selection transistor 207a are controlled to output an analog signal (A) via a first vertical signal line 208a, which may be an example of the vertical signal line 313a illustrated in FIG. 3 below. This set of components may be referred to as "Tap A." The photoelectric conversion device 201, the second transfer transistor 203b, the second tap reset transistor 204b, the second intervening transistor 205b, the second amplifier transistor 206b, and the second selection transistor 207b are controlled to output an analog signal (B) via a second vertical signal line 208b, which may be an example of the vertical signal line 313b illustrated in FIG. 3 below. This set of components may be referred to as "Tap B."

Additionally, in some examples, the pixel circuit 200 may also include two optional capacitors (optionality illustrated by boxes with dashed lines). The two optional capacitors include a first capacitor 213a and a second capacitor 213b. The first capacitor 213a is included in Tap A and the second capacitor 213b is included in Tap B. The two optional capacitors may be used to maximize the saturation charge by shorting the two optional capacitors to the respective floating diffusions FDa and FDb during charge collection. For example, when the two optional capacitors are included in the pixel circuit 200, the first and second intervening transistors 205a and 205b are ON continuously, and the first and second tap reset transistors 204a and 204b control the operation of the pixel circuit 200. However, when the two optional capacitors are not included in the pixel circuit 200, the first and second intervening transistors and the first and second tap reset transistors 204a and 204b are ON continuously, and the first and second intervening transistors 205a and 205b control the operation of the pixel circuit 200.

The first transfer transistor 203a and the second transfer transistor 203b are controlled by control signals on a first transfer gate line 209a and a second transfer gate line 209b, respectively. The first tap reset transistor 204a and the second tap reset transistor 204b are controlled by a control signal on a tap reset gate line 210. The first intervening transistor 205a and the second intervening transistor 205b are controlled by a control signal on a FD gate line 211. The first selection transistor 207a and the second selection transistor 207b are controlled by a control signal on a selection gate line 212. The first and second transfer gate lines 209a and 209b, the tap reset gate line 210, the FD gate line 211, and the selection gate line 212 may be examples of the horizontal signal lines 312 illustrated in FIG. 3 below.

In operation, the pixel circuit 200 may be controlled in a time-divisional manner such that, during a first half of a horizontal period, incident light is converted via Tap A to generate the output signal A; and, during a second half of the horizontal period, incident light is converted via Tap B to generate the output signal B.

During a light intensity imaging mode, the control signals with respect to the first transfer gate line 209a and the second transfer gate line 209b turn ON the first transfer transistor 203a and the second transfer transistor 203b and maintain the ON state of the first transfer transistor 203a and the second transfer transistor 203b for a predetermined period of time. During a depth imaging mode, the control signals with respect to the first transfer gate line 209a and the second transfer gate line 209b turn ON and OFF the first transfer transistor 203a and the second transfer transistor 203b at a specific modulation frequency.

While FIG. 2 illustrates the pixel circuit 200 having a plurality of transistors in a particular configuration, the current disclosure is not so limited and may apply to a configuration in which the pixel circuit 200 includes fewer or more transistors as well as other elements, such as additional capacitors (e.g., the two optional capacitors), resistors, and the like.

Figure 3:
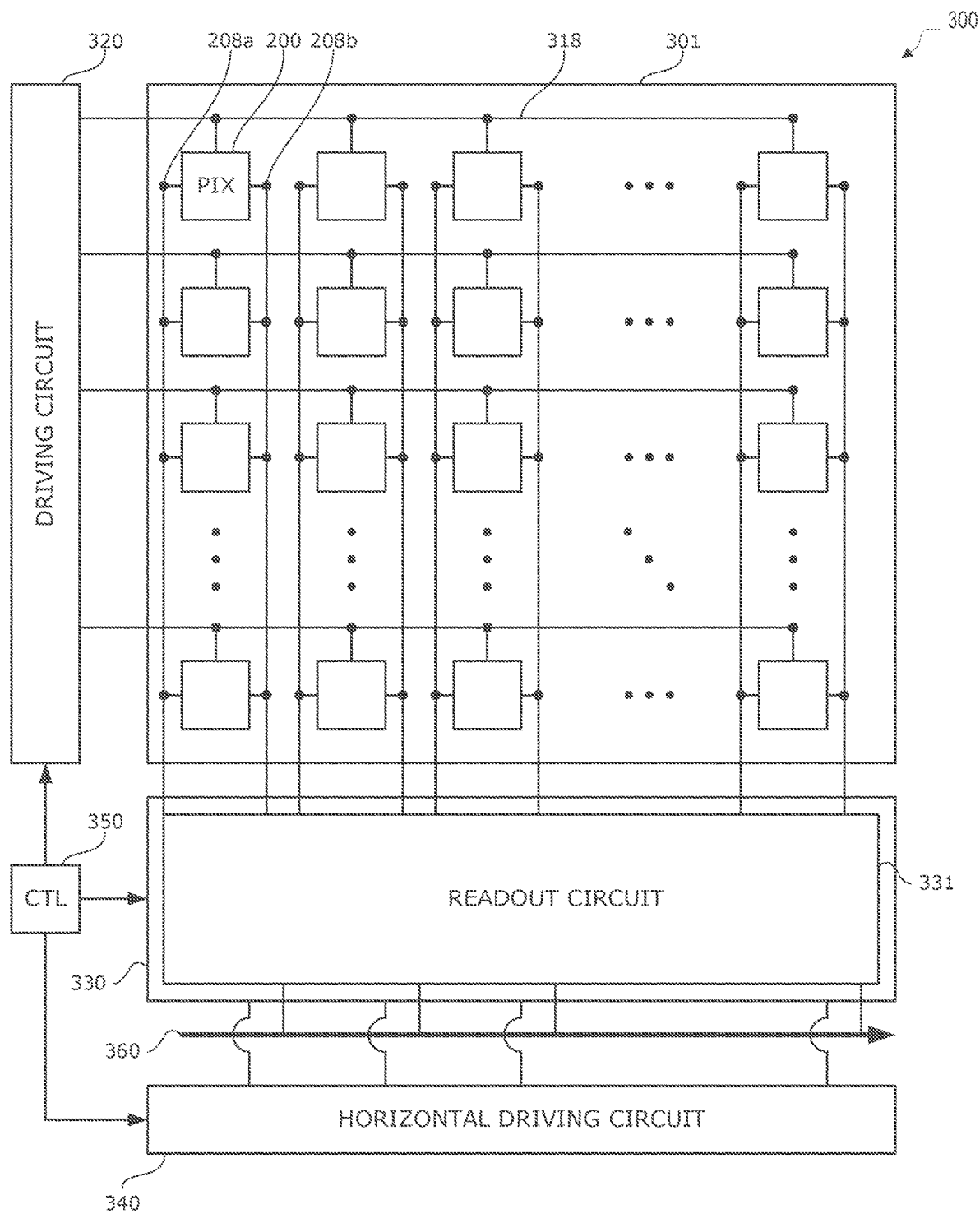
FIG. 3 is a circuit diagram illustrating an exemplary TOF image sensor according to various aspects of the present disclosure.

FIG. 3 is a circuit diagram illustrating an exemplary TOF image sensor 300 according to various aspects of the present disclosure. The TOF image sensor 300 includes an array 301 of the pixel circuits 200 as described above and illustrated in FIG. 2. The pixel circuits 200 are located at intersections where horizontal signal lines 318 and vertical signal lines 208a and 208b cross one another. The horizontal signal lines 318 are operatively connected to a vertical driving circuit 220, also known as a "row scanning circuit," at a point outside of the pixel array 301, and carry signals from the vertical driving circuit 320 to a particular row of the pixel circuits 200. Pixels in a particular column output analog signals corresponding to respective amounts of incident light to the vertical signal line 208a and 208b. For illustration purposes, only a subset of the pixel circuits 200 are actually shown in FIG. 3; however, in practice the image sensor 300 may have up to tens of millions of pixel circuits ("megapixels" or MP) or more.

The vertical signal lines 208a and 208b conduct the analog signals for a particular column to a column circuit 330, also known as a "signal processing circuit." Moreover, while FIG. 3 illustrates a single readout circuit 331 for all columns, the image sensor 300 may utilize a plurality of readout circuits 331. The analog electrical signals generated in photoelectric conversion device 201 in the pixel circuit 200 is retrieved by the readout circuit 231 and is then converted to digital values. Such a conversion typically requires several circuit components such as sample-and-hold (S/H) circuits, analog-to-digital converters (ADCs), and timing and control circuits, with each circuit component serving a purpose in the conversion. For example, the purpose of the S/H circuit may be to sample the analog signals from different time phases of the photodiode operation, after which the analog signals may be converted to digital form by the ADC.

Figure 4:
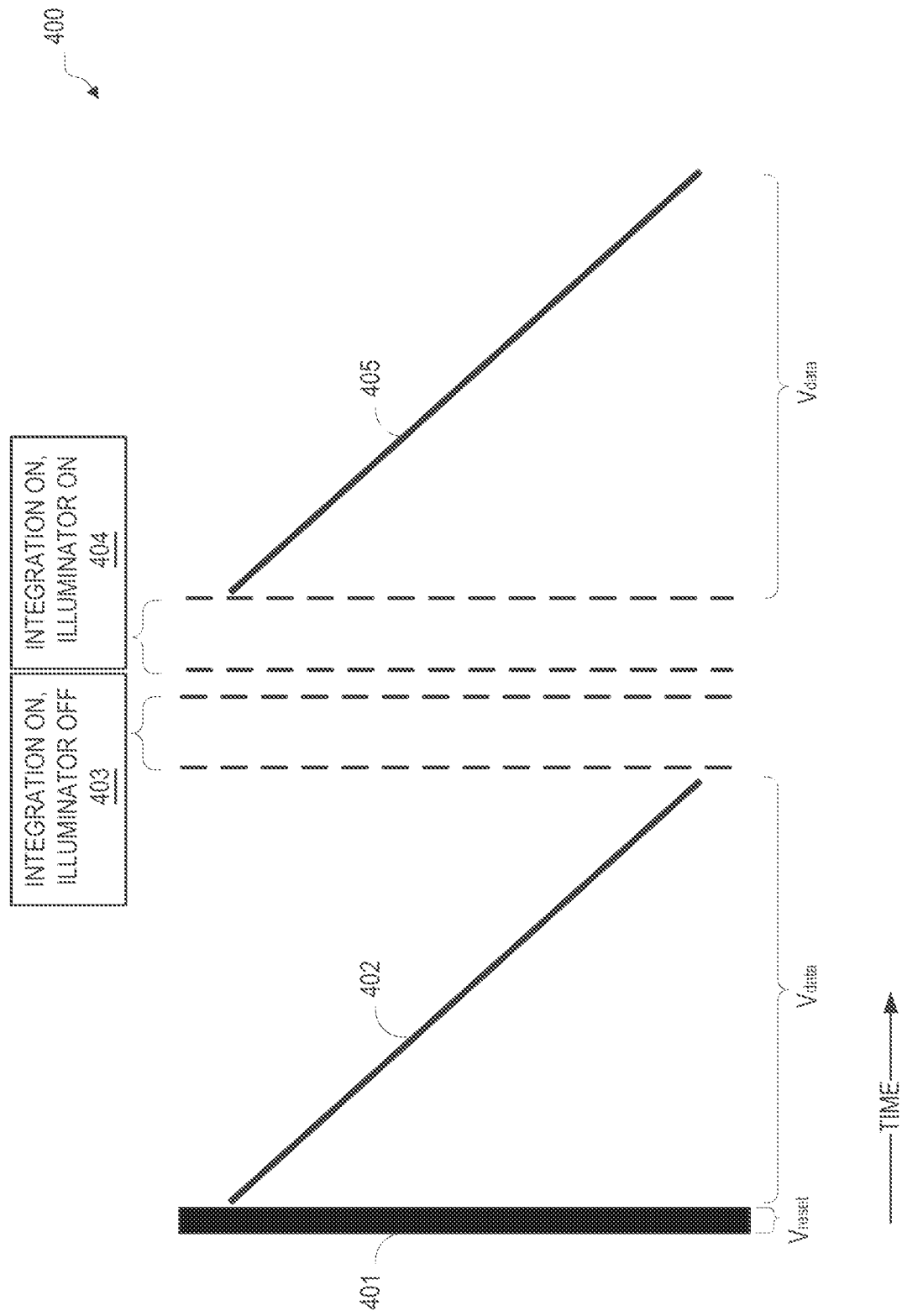
FIG. 4 is a diagram illustrating an exemplary process for ambient light subtraction according to various aspects of the present disclosure.

FIG. 4 is a diagram illustrating an exemplary process 400 for ambient light subtraction according to various aspects of the present disclosure. As illustrated in FIG. 4, the readout circuit 331 may perform the subtraction process 400 of AB frame correlated data sampling (also referred to as "AB Frame CDS") with respect to the exemplary TOF image sensor 112. AB Frame CDS also overcomes some pixel noise related issues by sampling each pixel circuit 200 twice. First, a first reset voltage $V_{reset}$ 401 is applied to each pixel circuit 200 to reset the FD. After the first reset voltage $V_{reset}$ 401 is applied, a first data voltage $V_{data}$ 402 of each pixel circuit 200 (that is, the voltage after each pixel circuit 200 has been exposed to light) is sampled at tap A (referred to as "first floating diffusion" or "FDa") and tap B (referred to as "second floating diffusion" or "FDb") and output as first data signals. After the first $V_{data}$ 402 sampling, a first integration 403 of the FD is performed at tap A with the illuminator in a non-emission state. After the first integration 403 of the FD, a second integration 404 of the FD is performed at tap B with the illuminator in an emission state. However, in other examples, the first integration 403 of the FD may be performed at tap B and the second integration 404 of the FD may be performed at tap A. After the second integration 404 of the FD, a second data voltage $V_{data}$ 405 of each pixel circuit 200 is sampled at tap A and tap B and output as second data signals.

In the AB Frame CDS, the first data voltage $V_{data}$ 402a (i.e., a first data signal sampled during a first frame) from tap A is equal to kTC noise at tap A and the first data voltage $V_{data}$ 402b at tap B is equal to kTC noise at tap B. The second data voltage $V_{data}$ 405a (i.e., a second data signal sampled during a second frame) from tap A is equal to kTC noise and ambient light at tap A and the second data voltage $V_{data}$ 405b from tap B is equal to kTC noise, ambient light, and a reflected light signal from the object. A frame-by-frame processing of AB Frame CDS is defined by the following expressions:

$$\text{Frame } 2(a) - \text{Frame } 1(a) = \Delta A = \text{Ambient}(a) \quad (1)$$

$$\text{Frame } 2(b) - \text{Frame } 1(b) = \Delta B = \text{Ambient}(b) + \text{Signal}(b) \quad (2)$$

In the above expressions, frame 2(a) is the second data signal from tap A and frame 1(a) is the first data signal from tap A. Similarly, in the above expressions, frame 2(b) is the second data signal from tap B and frame 1(b) is the first data signal from tap B. Additionally, in the above expressions, ambient(a) is indicative of the ambient light level, ambient (b) is indicative of the ambient level, and signal(b) is indicative of the light signal emitted by a light generator and reflected from an object, kTCa is pixel reset and readout noise associated with tap A, and kTCb is pixel reset and readout noise associated with tap B.

A per pixel processing of AB Frame CDS is defined by the following expression:

$$\Delta B - \Delta A = \text{Signal}(b) + \text{Ambient}(b) - \text{Ambient}(a) = \text{Signal}(b) \quad (3)$$

Put simply, a third data signal representing a difference between the second data signal and the first data signal from tap A is then subtracted from a fourth data signal representing a difference between the second data signal and the first data signal from tap B to output a fifth data signal that is indicative of a light signal reflected from an object, i.e., Signal(b).

The noise in AB Frame CDS is defined by the following expressions:

$$\Delta A = \sqrt{\text{Ambient}(a)}, \sqrt{2 * rd_{noise}} \quad (4)$$

$$\Delta B = \sqrt{\text{Ambient}(b)}, \sqrt{2 * rd_{noise}}, \sqrt{\text{Signal}(b)} \quad (4)$$

$$\Delta B - \Delta A = \sqrt{\text{Ambient}(a)}, \sqrt{\text{Ambient}(b)}, \sqrt{4 * rd_{noise}}, \sqrt{\text{Signal}(b)} \quad (6)$$

In the above expressions, rd_noise includes noise from short follower (SF), analog-to-digital conversion (ADC), and quantization. One benefit of the AB Frame CDS process 400 is kTC noise removal. Another benefit of the AB Frame CDS process 400 is ambient light removal. Yet another benefit of the AB Frame CDS process 400 is the use of two integrations consecutive in time, which is beneficial for a dynamic scene because the two integrations consecutive in time provide motion robustness. Another aspect of the AB Frame CDS process 400 is that the well capacity of the pixel circuit 200 is limited to one tap.

Figure 5:
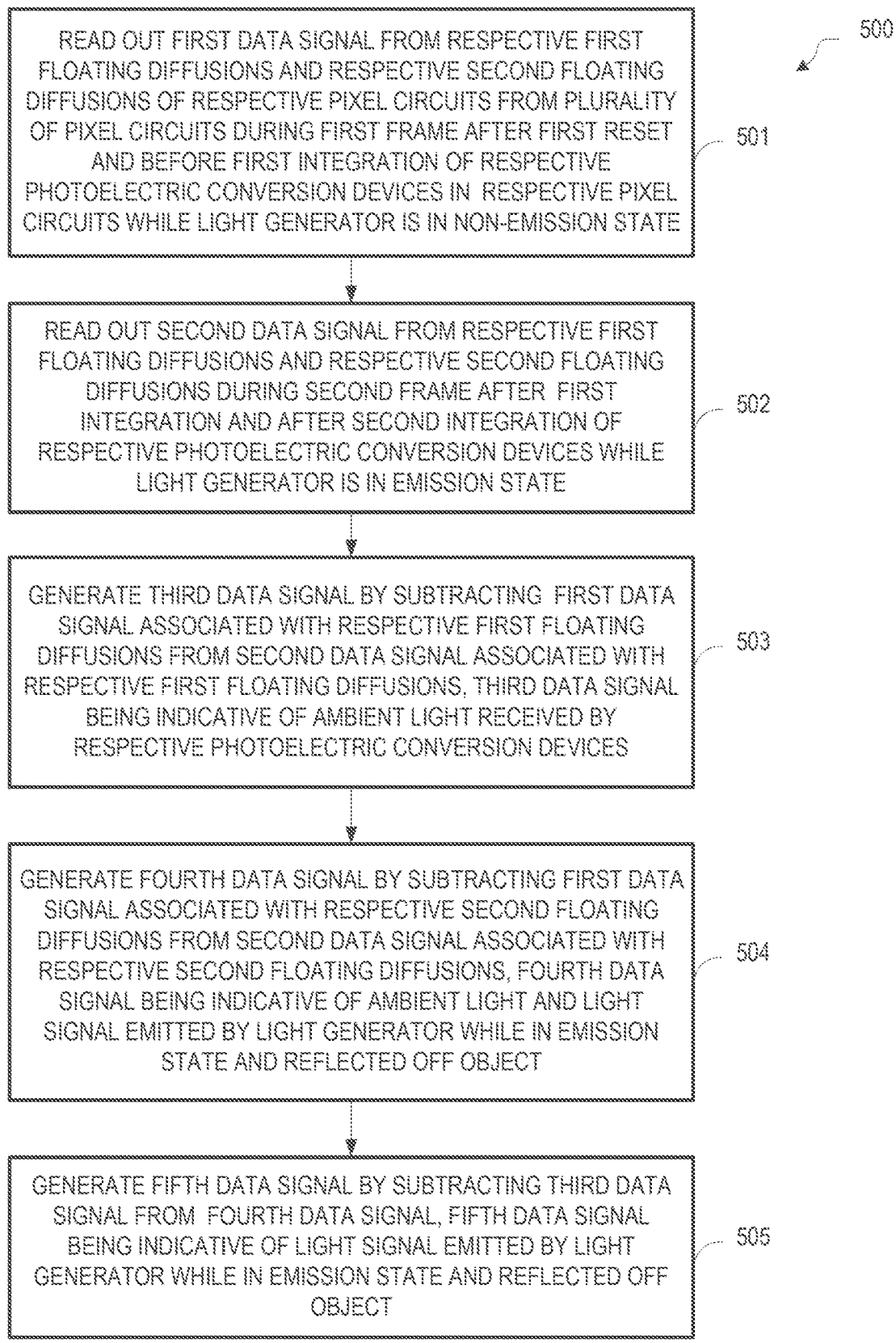
FIG. 5 is a flowchart illustrating a method for operating the exemplary TOF imaging system of FIG. 1 according to various aspects of the present disclosure.

FIG. 5 is a flowchart illustrating a method 500 for operating a TOF imaging sensor according to various aspects of the present disclosure. FIG. 5 is described with respect to FIGS. 1-4.

The method 500 includes reading out, with a signal processing circuit, a first data signal from respective first floating diffusions and respective second floating diffusions of respective pixel circuits from a plurality of pixel circuits during a first frame, the first frame being after a first reset and before a first integration of respective photoelectric conversion devices in the respective pixel circuits while a light generator is in a non-emission state, wherein each of the respective first floating diffusions and the respective second floating diffusions is electrically connected to only one of the respective photoelectric conversion devices (at block 501). For example, the readout circuit 331 reads out a first data signals 402a and 402b from respective first floating diffusions FDa and respective second floating diffusions FDb of respective pixel circuits from a plurality of pixel circuits 301 during a first frame, the first frame being after a first reset 401 and before a first integration 403 of respective photoelectric conversion devices 201 in the respective pixel circuits while a light generator 111 is in a non-emission state. Each of the respective first floating diffusions FDa and the respective second floating diffusions FDb is electrically connected to only one of the respective photoelectric conversion devices 201.

The method 500 further includes reading out, with the signal processing circuit, a second data signal from the respective first floating diffusions and the respective second floating diffusions during a second frame, the second frame being after the first integration and after a second integration of the respective photoelectric conversion devices while the light generator is in an emission state (at block 502). For example, the readout circuit 331 reads out a second data signals 405a and 405b from the respective first floating diffusions FDa and the respective second floating diffusions FDb during a second frame, the second frame being after the first integration 403 and after a second integration 404 of the respective photoelectric conversion devices 201 while the light generator 111 is in an emission state.

The method 500 further includes generating, with the signal processing circuit, a third data signal by subtracting the first data signal associated with the respective first floating diffusions from the second data signal associated with the respective first floating diffusions, the third data signal being indicative of ambient light received by the respective photoelectric conversion devices (at block 503). For example, the readout circuit 331 generates a third data signal (i.e., ΔA) by subtracting the first data signal 402a associated with the respective first floating diffusions FDa from the second data signal 405a associated with the respective first floating diffusions FDa, the third data signal being indicative of ambient light (i.e., ambient(a)) received by the respective photoelectric conversion devices 201.

The method 500 further includes generating, with the signal processing circuit, a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object (at block 504). For example, the readout circuit 331 generates a fourth data signal (i.e., ΔB) by subtracting the first data signal 402b associated with the respective second floating diffusions FDb from the second data signal 405b associated with the respective second floating diffusions FDb, the fourth data signal (i.e., ΔB) being indicative of the ambient light (i.e., ambient(b)) and a light signal (i.e., signal (b)) emitted by the light generator 111 while in the emission state and reflected off an object 102.

The method 500 further includes generating, with the signal processing circuit, a fifth data signal by subtracting the third data signal from the fourth data signal, the fifth data signal being indicative of the light signal emitted by the light generator while in the emission state and reflected off the object (at block 505). For example, the readout circuit 331 generates a fifth data signal (i.e., ΔB−ΔA) by subtracting the third data signal (e.g., ambient(a)) from the fourth data signal (e.g., signal(b) and ambient(b)), the fifth data signal being indicative of the light signal (e.g., signal(b)) emitted by the light generator 111 while in the emission state and reflected off the object 102.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A time-of-flight image sensor comprising:
   a pixel array including a plurality of pixel circuits, respective pixel circuits of the plurality of pixel circuits individually including
      a photoelectric conversion device,
      a first floating diffusion, and
      a second floating diffusion;
   a control circuit configured to control a first reset of respective first floating diffusions and respective second floating diffusions in the respective pixel circuits; and
   a signal processing circuit configured to
      read out a first data signal from the respective first floating diffusions and the respective second floating diffusions in the respective pixel circuits during a first frame, the first frame being after the first reset and before a first integration of respective photoelectric conversion devices in the respective pixel circuits while a light generator is in a non-emission state,
      read out a second data signal from the respective first floating diffusions and the respective second floating diffusions in the respective pixel circuits during a second frame, the second frame being after the first integration and after a second integration of the respective photoelectric conversion devices while the light generator is in an emission state,
      generate a third data signal by subtracting the first data signal associated with the respective first floating diffusions from the second data signal associated with the respective first floating diffusions, the third data signal being indicative of ambient light received by the respective photoelectric conversion devices,
      generate a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object, and
      generate a fifth data signal by subtracting the third data signal from the fourth data signal, the fifth data signal being indicative of the light signal emitted by the light generator while in the emission state and reflected off the object.

2. The time-of-flight image sensor according to claim 1, wherein the signal processing circuit is further configured to output the fifth data signal as a light intensity image.

3. The time-of-flight image sensor according to claim 2, wherein the light intensity image is an infrared (IR) or near-IR light intensity image.

4. A method for operating a time-of-flight image sensor, the method comprising:
   reading out, with a signal processing circuit, a first data signal from respective first floating diffusions and respective second floating diffusions of respective pixel circuits from a plurality of pixel circuits during a first frame, the first frame being after a first reset and before a first integration of respective photoelectric conversion devices in the respective pixel circuits while a light generator is in a non-emission state, wherein each of the respective first floating diffusions and the respective second floating diffusions is electrically connected to only one of the respective photoelectric conversion devices;

reading out, with the signal processing circuit, a second data signal from the respective first floating diffusions and the respective second floating diffusions during a second frame, the second frame being after the first integration and after a second integration of the respective photoelectric conversion devices while the light generator is in an emission state;

generating, with the signal processing circuit, a third data signal by subtracting the first data signal associated with the respective first floating diffusions from the second data signal associated with the respective first floating diffusions, the third data signal being indicative of ambient light received by the respective photoelectric conversion devices;

generating, with the signal processing circuit, a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object; and generating, with the signal processing circuit, a fifth data signal by subtracting the third data signal from the fourth data signal, the fifth data signal being indicative of the light signal emitted by the light generator while in the emission state and reflected off the object.

5. The method according to claim 4, further comprising:
outputting, with the signal processing circuit, the fifth data signal as a light intensity image.

6. The method according to claim 5, wherein the light intensity image is an infrared (IR) or near-IR light intensity image.

7. A system comprising:
a light generator configured to emit a light wave; and
a time-of-flight image sensor including a pixel array including
a plurality of pixel circuits, respective pixel circuits of the plurality of pixel circuits individually including
a photoelectric conversion device,
a first floating diffusion, and
a second floating diffusion,
a control circuit configured to control a first reset of respective first floating diffusions and respective second floating diffusions in the respective pixel circuits, and
a signal processing circuit configured to
read out a first data signal from the respective first floating diffusions and the respective second floating diffusions in the respective pixel circuits during a first frame, the first frame being after the first reset and before a first integration of respective photoelectric conversion devices in the respective pixel circuits while the light generator is in a non-emission state,
read out a second data signal from the respective first floating diffusions and the respective second floating diffusions in the respective pixel circuits during a second frame, the second frame being after the first integration and after a second integration of the respective photoelectric conversion devices while the light generator is in an emission state,
generate a third data signal by subtracting the first data signal associated with the respective first floating diffusions from the second data signal associated with the respective first floating diffusions, the third data signal being indicative of ambient light received by the respective photoelectric conversion devices,
generate a fourth data signal by subtracting the first data signal associated with the respective second floating diffusions from the second data signal associated with the respective second floating diffusions, the fourth data signal being indicative of the ambient light and a light signal emitted by the light generator while in the emission state and reflected off an object, and
generate a fifth data signal by subtracting the third data signal from the fourth data signal, the fifth data signal being indicative of the light signal emitted by the light generator while in the emission state and reflected off the object.

8. The system according to claim 7, wherein the signal processing circuit is further configured to output the fifth data signal as a light intensity image.

9. The system according to claim 8, wherein the light intensity image is an infrared (IR) or near-IR light intensity image.

10. The system according to claim 8, further comprising:
a controller configured to
receive the light intensity image, and
perform facial detection of the object based on the light intensity image.

11. The system according to claim 10, wherein the signal processing circuit is further configured to output a sixth digital signal as a depth image, and wherein the controller is further configured to
receive the depth image, and
calculate a depth map indicative of a distance d to various points of the object based on the depth image.

* * * * *